United States Patent
Vijaykumar et al.

(10) Patent No.: US 8,868,115 B2
(45) Date of Patent: Oct. 21, 2014

(54) SYSTEM AND METHOD OF COMMUNICATION

(76) Inventors: Sanjay Vijaykumar, Kerala (IN); Vishnu Gopal, Kerala (IN); Hari Gopal, Kerala (IN)

( * ) Notice: Subject to any disclaimer, the term of this patent is extended or adjusted under 35 U.S.C. 154(b) by 162 days.

(21) Appl. No.: 13/490,652

(22) Filed: Jun. 7, 2012

(65) Prior Publication Data

US 2013/0053060 A1  Feb. 28, 2013

(51) Int. Cl.
*H04W 4/00* (2009.01)
*H04W 4/14* (2009.01)
*H04W 40/20* (2009.01)
*H04L 29/08* (2006.01)
*H04L 29/06* (2006.01)
*H04W 88/16* (2009.01)

(52) U.S. Cl.
CPC .............. *H04L 67/141* (2013.01); *H04L 67/02* (2013.01); *H04W 4/14* (2013.01); *H04W 40/20* (2013.01); *H04L 67/146* (2013.01); *H04L 67/28* (2013.01); *H04L 67/2823* (2013.01); *H04L 69/08* (2013.01); *H04W 88/16* (2013.01)
USPC ........................................................ 455/466

(58) Field of Classification Search
USPC ........................................................ 455/466
See application file for complete search history.

(56) References Cited

U.S. PATENT DOCUMENTS

| | | | |
|---|---|---|---|
| 6,330,445 B1 * | 12/2001 | Skog et al. | 455/433 |
| 2006/0111134 A1 * | 5/2006 | Mills | 455/518 |
| 2011/0159843 A1 * | 6/2011 | Heath et al. | 455/411 |

OTHER PUBLICATIONS

Puneet Gupta, End to End USSD System, Jul. 7, 2010, TATA Tele Service Limited, India.*

* cited by examiner

*Primary Examiner* — Vladimir Magloire
(74) *Attorney, Agent, or Firm* — David A. Guerra

(57) ABSTRACT

The invention provides a system and method of communication comprising a USSD interface that is independent of the supporting stack the USSD is operating in. By decoupling the supporting stack from the USSD interface, similar services can be deployed across various service providers or network operators thereby enhancing the usability and efficiency of the USSD interface. The system includes client equipment configured to initiate a session by sending a session identification code, a gateway server coupled to the client equipment, and a USSD platform communicatively coupled to the gateway server via a configurable protocol. The gateway server initiates the session upon receiving the session identification code. The USSD platform communicates in real-time with the client equipment through the gateway server.

14 Claims, 1 Drawing Sheet

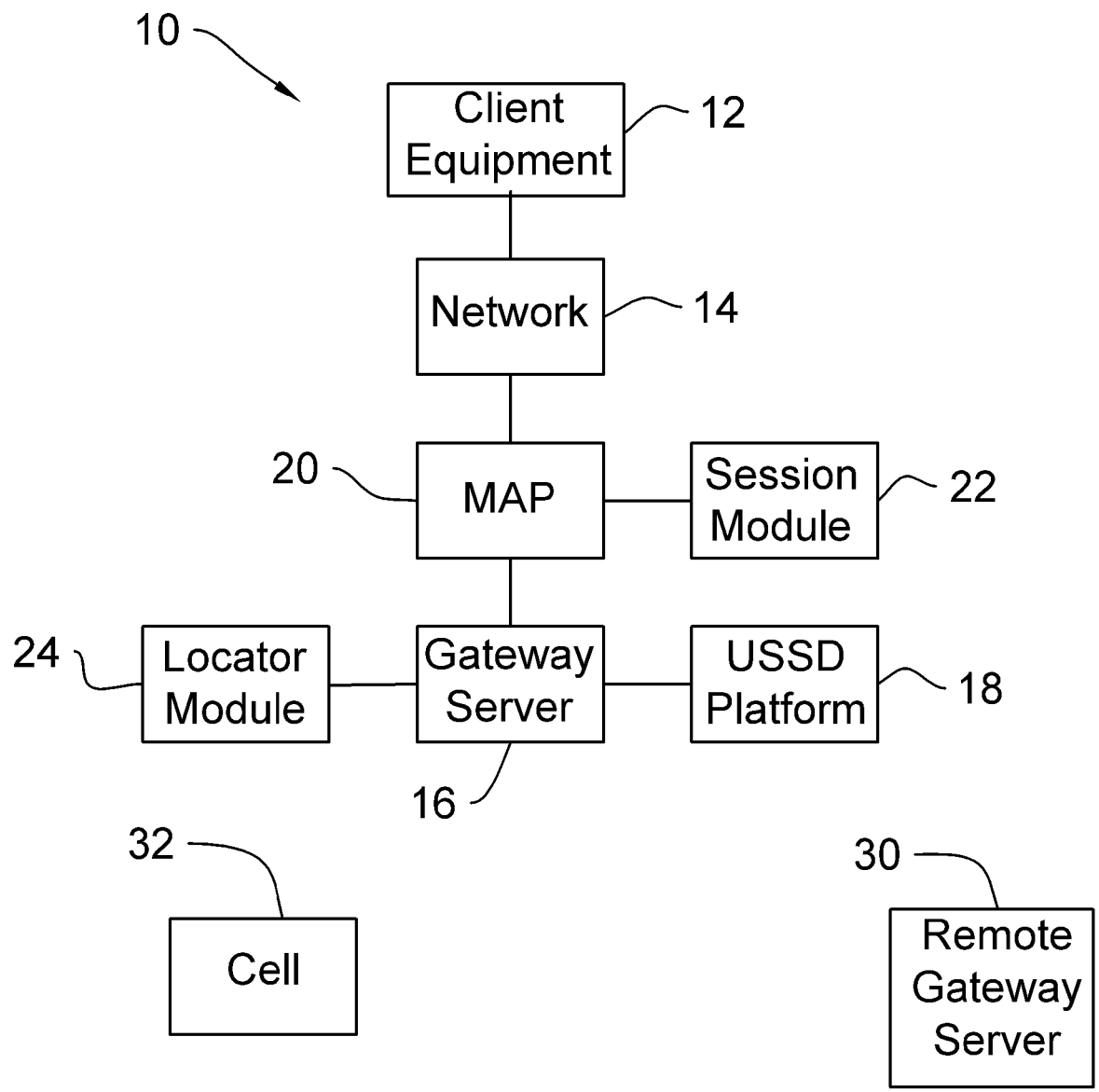

SYSTEM AND METHOD OF COMMUNICATION

CROSS-REFERENCE TO RELATED APPLICATION

The present application claims priority under 35 U.S.C. 119(a) to India (IN) patent application number 3001/CHE/2011 filed Aug. 30, 2011, which IN patent application is incorporated herein by reference in its entirety.

BACKGROUND OF THE INVENTION

1. Field of the Invention

The present invention generally relates to communication systems and more particularly to network applications employed in a telecommunication system.

2. Description of the Prior Art

Unstructured Supplementary Service Data (USSD) is a protocol used by GSM cellular telephones to communicate with the service provider's computers. USSD can be used for WAP browsing, prepaid callback service, mobile-money services, location-based content services, menu-based information services, and as part of configuring the phone on the network.

USSD messages create a real-time connection during a USSD session. The connection remains open, allowing a two-way exchange of a sequence of data. This makes USSD more responsive than services that use SMS.

Some of the USSD services described in the prior art are specific to a certain USSD supporting stack such as USSD services on Signaling system 7 (SS7) network. However, due to changing nature of the telecommunication industry, service providers may shift from one supporting stack to another. Portability of the USSD applications from one supporting to stack to another is time consuming and herculous.

Hence there exists a need for developing USSD that is adaptable to various supporting stacks in order to enhance the portability of the USSD. In this regard, the present invention substantially fulfills this need. In this respect, the system and method of communication according to the present invention substantially departs from the conventional concepts and designs of the prior art, and in doing so provides an apparatus primarily developed for the purpose of network applications employed in a telecommunication system.

SUMMARY OF THE INVENTION

In view of the foregoing disadvantages inherent in the known types of USSD messaging and services now present in the prior art, the present invention provides an improved system and method of communication, and overcomes the above-mentioned disadvantages and drawbacks of the prior art. As such, the general purpose of the present invention, which will be described subsequently in greater detail, is to provide a new and improved system and method of communication and method which has all the advantages of the prior art mentioned heretofore and many novel features that result in a system and method of communication which is not anticipated, rendered obvious, suggested, or even implied by the prior art, either alone or in any combination thereof.

The above-mentioned shortcomings, disadvantages and problems are addressed herein which will be understood by reading and understanding the following specification.

In one embodiment, the invention provides a system and method of communication comprising a USSD interface that is independent of the supporting stack the USSD is operating in. By decoupling the supporting stack from the USSD interface, similar services can be deployed across various service providers or network operators thereby enhancing the usability and efficiency of the USSD interface.

More particularly, in one embodiment, a system of communication is provided, that comprises at least one client configured to initiate a session by sending a session identification code, a gateway server coupled to the at least one client, the gateway server configured for initiating the session upon receiving the session identification code and a USSD platform communicatively coupled to the gateway server via configurable protocol, the USSD platform configured for communicating in real-time with the at least one client through the gateway server.

In another embodiment, a method of communication is provided. The method comprising steps of sending a session identification code to a gateway server by a client for initiating a session with a USSD platform, initiating the session upon receiving the session identification code at the gateway server and establishing a real time communication between the USSD platform and the client through the gateway server wherein the USSD platform communicates with the gateway server via a configurable protocol.

Systems and methods of varying scope are described herein. In addition to the aspects and advantages described in this summary, further aspects and advantages will become apparent by reference to the drawings and with reference to the detailed description that follows.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic diagram view of an embodiment of the communication system constructed in accordance with the principles of the present invention.

The same reference numerals refer to the same parts throughout the various figures.

DETAILED DESCRIPTION OF THE INVENTION

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Unstructured Supplementary Services Data (USSD) is a GSM (global system for mobile communication) service which allows high speed interactive communication between the subscribers and applications. There is minimal delay between sending the query and receiving the response. Unlike SMS, USSD is a session-oriented service. USSD platform is a platform that enables operators to introduce messaging services with USSD as the bearer, enabling faster response times.

The platform is complementary to existing SMS services, bringing faster interactive messaging to users. It acts as a gateway between applications and the mobile network (such as GSM) and lets the service provider deliver USSD messages of up to 182 characters on a network between mobile stations and applications.

As with SMS, USSD uses the signaling channel as the bearer. However, instead of having the store and forward functionality, it is session oriented, which means that when a user accesses a service with USSD, a session is established and the radio connection stays put until the user, application, or time out releases it. This provides faster response times for interactive applications.

In one embodiment a technology stack and network operator independent interface for USSD applications is provided. The USSD application is built using a high level programming language (for example Python, Ruby and Java) that acts as a bridge between operator-specific USSD platform and a flexible integrated development environment.

In accordance with the above embodiment, a system of communication 10 is provided. The system 10 comprises at least one client using a client equipment 12 configured to initiate a session by sending a session identification code, a gateway server 16 coupled to the at least one client 12, the gateway server 16 configured for initiating the session upon receiving the session identification code and a USSD platform 18 communicatively coupled to the gateway server 16 via a configurable protocol (such as IP) the USSD platform 18 configured for communicating in real-time with the at least one client 12 through the gateway server 16.

The client initiates the session using a user equipment 12 which can communicate with a mobile network 14. The user equipment is one of a mobile device, a mobile communication device, a communication device, a gaming device, a portable media player, a cellular phone, a mobile phone, a portable device, a laptop, a handheld, a personal digital assistant (PDA), a portable music player, a portable gaming device, a desktop device, a home media center, and a smart phone.

The USSD platform 18 provides standard USSD applications and it includes the USSD runtime interactive engine that allows interaction with users that access the USSD service. The gateway server 16 connects over configurable protocol to the operator's USSD platform 18 using standard protocols such as XML-RPC and SOAP, transported over VPN and connects to application servers via a well-defined interface using the HTTP or SMPP protocol. The simplified approach permits easy interaction and removes the hassle of handling complex SS7 connectivity, as well as regulation restrictions related to SS7 networks.

The system further comprises a mobile application part (MAP) 20 module coupled to the gateway server 16 and the at least one client 12. The mobile application part module 20 is configured to receive at least one message from the at least one client 12 and deliver the received message to the gateway server 16.

The system further comprises a session module 22 coupled to the mobile application part module 20, the session module 22 is configured to maintain a list of ongoing sessions. The gateway server 16 is further configured to receive the message from the MAP module 20 and further route the message to the USSD platform 18.

The gateway server 16 is a server (which can host one or several USSD services) and each service can be addressed separately by a specific session identification code. The gateway server 16 provides a graphical development environment that lets the user create USSD services and deploy them. It provides a platform for a service provider who wants to offer value added services to a large mobile community.

The gateway server 16 is used to hook into the USSD platform 18 of one or several operators in order to send USSD commands. Such a set up can serve for example to transfer prepaid credit from one subscriber to another subscriber, if the functionality is available as a USSD service at the operator. The USSD client bridge relies on the use of IP protocol and includes the stacks: XML, RPC and SOAP. The gateway server 16 can be addressed by client applications 12 using either XML-RPC or SOAP.

Accordingly, the USSD platform 18 supports GUI-based, menu-oriented service creation environment for definition of menu structures and integration with content providers together with internet interfaces to static messages and web-based content providers.

The USSD platform 18 is built on Application Management and Data Transformation. Therefore, the USSD interface represents a subset of the USSD interface functionalities that are exposed as simple flowcharts to enable a non-technical person to compose services. Common building blocks are provided that can be drawn on a screen, connected to each other, and routed using inbuilt functionality to construct non-trivial USSD applications. The USSD platform 18 is built in a state machine domain-specific language, where each component of a detailed flowchart can be directly mapped to a context in the DSL. Several common USSD constructs such as a menu, easy response parsing, timeouts etc. are modeled as high-level constructs in the DSL.

This coupled with detailed statistical analysis, self-testing and resource monitoring facilitates sustained reliable service delivery from the USSD platform 18. USSD platform enhanced cell-switching features which, together with advanced session management capabilities of the session module enables session's preservation even when the subscriber changes cells.

The USSD operator gateway server integrates into the operator's environment as a complete USSD server platform. By using a versatile graphical environment, the operator can create several services with interactive menus and attach them to session identification codes. The graphical environment offers a palette of useful components such as database access, TCP/configurable protocol library, SMTP, POP3, and more, making the development of the USSD application richer and more open to external environment and data.

The USSD platform 18 can locally host USSD applications, but it can also trigger external processes through an URL address in order to handover the USSD service to a third party service provider, which can be, in such case, a remote USSD ASP gateway server 30. The provisioning of the third party service provider is done inside the gateway server 16 through a simple Web Administration Interface.

The USSD platform provides easy integration to operator backend services using a simple HTTP interface. Billing, customer service URLs, SMSC/MMSC integration and SS7 service stack integration are provided to the USSD interface.

The system further comprises a locator module 24 coupled to the gateway server 16, the locator module 24 being configured to detect a cell 32 based on the location of the at least one client 12 and relay location information of the cell to the gateway server 16 so as to facilitate routing the message to the USSD platform 18. The locator module 24 utilizes the last known location data to send a network initiated unstructured supplementary service data (USSD) message to the user equipment 12 via a mixed network 14. The mixed network 14 further comprises a global system for mobile communications (GSM) component and an Internet Protocol (IP) multimedia subsystem (IMS) component. The locator module 24 transmits the network initiated USSD message directly to at least one of a last known visitor location register (VLR) of the user equipment 12 as indicated by a previous user equipment initiated message and a last known servicing call server control function (S-CSCF) address of the user equipment 12 as indicated by a previous user equipment initiated message.

In another embodiment, a method of communication is provided. The method comprises sending a session identification code to a gateway server 16 by a client 12 for initiating a session with a USSD platform 18, initiating the session upon receiving the session identification code at the gateway server 16 and establishing a real time communication between the USSD platform 18 and the client 12 through the gateway server 16 wherein the USSD platform 18 communicates with the gateway server 16 via a configurable protocol.

In yet another embodiment, a method of using a digital telecommunications system for the access, navigation and use of digital applications and services is provided. The method comprises the steps of: allocating codes of the unstructured supplementary services data, creating logic of the services, testing, evaluation and versioning the services, and activating, deploying, using and saving the services wherein the USSD platform is developed on a configurable protocol (such as IP) based stack.

In yet another embodiment, a computer program product that comprises program instructions for executing a method of communication is provided. Accordingly, the computer program product comprises code for sending a session identification code to a gateway server 16 by a client 12 for initiating a session with a USSD platform 18, code for initiating the session upon receiving the session identification code at the gateway server 16 and code for establishing a real time communication between the USSD platform 18 and the client 12 through the gateway server 16 wherein the USSD platform 18 communicates with the gateway server 16 via a configurable protocol.

Further, in accordance with the above embodiment, an interactive USSD test simulator is also provided that enables easy testing of the USSD service. The test simulator works with all features of the USSD platform including support for Unicode and accurately simulates timeout features of the user equipment.

The advantages of the system and method provided herein include enabling a one-time write, change and debug of the code that can be uniformly deployed across one or more service providers and technology stack. For code reuse, discrete components are separated out into libraries, and these code libraries can be composed to integrate with several different services.

The system and method may be implemented using hardware, software, or a combination thereof for performing the functions described herein. By way of example, the system may be a processor, an ASIC, a comparator, or other hardware means. Likewise, the system may include software or other computer-executable instructions that may be stored in a memory and may be executable by a processor or other processing means.

This written description uses examples to describe the subject matter herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system of communication, said system comprising:
   at least one client equipment configured to initiate a session by sending a session identification code;
   a gateway server coupled to said at least one client equipment, said gateway server configured for initiating said session upon receiving said session identification code;
   a USSD platform communicatively coupled to said gateway server via a configurable protocol, said USSD platform configured for communicating in real-time with said at least one client equipment through said gateway server based on maintenance of said session identification code of said session and detection of a cell of said at least one client equipment; and
   a locator module coupled to said gateway server, said locator module configured to detect the cell based on a location of said at least one client equipment and relay location information of said cell to said gateway server so as to facilitate routing at least one message to said USSD platform;
   wherein said gateway server being configured to receive said at least one message from a mobile application part (MAP) module and further route said message to said USSD platform.

2. The system of claim 1 wherein said mobile application part (MAP) module is coupled to said gateway server and said at least one client equipment, said mobile application part module is configured to receive said at least one message from said at least one client equipment and deliver said received message to said gateway server.

3. The system of claim 2 further comprising a session module coupled to said mobile application part module, said session module configured to maintain a list of on-going sessions.

4. The system of claim 1, wherein said message is routed using short message peer to peer (SMPP) protocol.

5. The system of claim 1, wherein said USSD platform is configured for triggering one or more external processes using a corresponding uniform resource locator (URL) address to enable provisioning of a third party service provider.

6. The system of claim 5, wherein said gateway server is configured for provisioning said third party service provider through a Web Administration Interface.

7. The system of claim 1, wherein said gateway server is configured to communicate to said client equipment using one of extensible markup language (XML), remote procedure call (RPC) and simple object access protocol (SOAP).

8. A method of communication, said method comprising the steps of:
   sending a session identification code to a gateway server by a client equipment for initiating a session with a USSD platform;
   initiating said session upon receiving said session identification code at said gateway server; and
   establishing a real time communication between said USSD platform and said client equipment through said gateway server wherein said USSD platform communicates with said gateway server via a configurable protocol based on maintenance of said session identification code of said session and detection of a cell of said at least one client equipment;
   receiving at least one message from said client equipment;
   delivering said received message to said gateway server by a mobile application part (MAP) module; and
   detecting the cell based on a location of said client equipment by a locator module and further relaying location information of said cell to said gateway server so as to facilitate routing said message to said USSD platform.

9. The method of claim 8 further comprising steps of:
   receiving said message from said MAP module; and
   routing said message to said USSD platform by said gateway server.

10. A method of digital telecommunication, said method comprising the steps of:
    allocating codes for an unstructured supplementary services data (USSD) platform; and
    enabling a range of services based on the allocated code and maintenance of a session identification code of a session and detection of a cell of said at least one client equipment wherein said USSD platform is developed on a configurable protocol based stack;
    receiving at least one message from a client equipment;
    delivering said received message to said gateway server by a mobile application part (MAP) module; and
    detecting the cell based on a location of said client equipment by a locator module and further relaying location information of said cell to said gateway server so as to facilitate routing said message to said USSD platform.

11. The method of digital telecommunication of claim 10, wherein said configurable protocol is an internet protocol.

12. The method of digital communication of claim 11 further comprising the steps of:
    sending the session identification code to a gateway server by said client equipment for initiating a session with said USSD platform;
    initiating said session upon receiving said session identification code at said gateway server; and
    establishing a real time communication between said USSD platform and said client equipment through said gateway server wherein said USSD platform communicates with said gateway server via a configurable protocol.

13. The method of digital communication of claim 12 further comprising steps of:
    receiving said message from said MAP module; and
    routing said message to said USSD platform at said gateway server.

14. The system of claim 1, wherein said locator module utilizes a last known location data to send said message to said client equipment via a mixed network, said mixed network being a global system for mobile communications (GSM) component and an Internet Protocol (IP) multimedia subsystem (IMS) component.

* * * * *